US008049660B2

(12) United States Patent
Mizutani et al.

(10) Patent No.: US 8,049,660 B2
(45) Date of Patent: Nov. 1, 2011

(54) RADAR APPARATUS CONFIGURED TO SUPPRESS EFFECTS OF GRATING LOBES UPON DETECTION OF DIRECTION OF TARGET BASED ON PHASE DIFFERENCE BETWEEN RECEIVED REFLECTED WAVES

(75) Inventors: Akiyoshi Mizutani, Kasugai (JP); Kazuma Natsume, Oobu (JP)

(73) Assignee: Denso Corporation, Kariya (JP)

( * ) Notice: Subject to any disclaimer, the term of this patent is extended or adjusted under 35 U.S.C. 154(b) by 76 days.

(21) Appl. No.: 12/660,717

(22) Filed: Mar. 3, 2010

(65) Prior Publication Data
US 2010/0225523 A1 Sep. 9, 2010

(30) Foreign Application Priority Data

Mar. 4, 2009 (JP) ................................. 2009-051259

(51) Int. Cl.
*G01S 13/00* (2006.01)
*H01Q 21/08* (2006.01)
(52) U.S. Cl. ........ 342/149; 342/147; 342/154; 342/157; 342/158; 343/824
(58) Field of Classification Search .................. 342/147, 342/149, 153, 154, 157, 158; 343/824
See application file for complete search history.

(56) References Cited

U.S. PATENT DOCUMENTS

| 4,339,755 | A | * | 7/1982 | Wright | 342/458 |
|---|---|---|---|---|---|
| 5,181,037 | A | * | 1/1993 | Komatsu | 342/70 |
| 5,181,040 | A | * | 1/1993 | Inoue et al. | 342/149 |
| 5,229,774 | A | * | 7/1993 | Komatsu | 342/70 |
| 5,274,384 | A | * | 12/1993 | Hussain et al. | 342/373 |
| 5,448,244 | A | * | 9/1995 | Komatsu et al. | 342/155 |
| 5,579,010 | A | * | 11/1996 | Iihoshi et al. | 342/70 |
| 6,072,422 | A | * | 6/2000 | Yamada | 342/70 |
| 6,085,151 | A | * | 7/2000 | Farmer et al. | 701/301 |
| 6,246,359 | B1 | * | 6/2001 | Asano et al. | 342/158 |
| 6,339,395 | B1 | * | 1/2002 | Hazumi et al. | 342/196 |

(Continued)

FOREIGN PATENT DOCUMENTS

JP 06-029736 2/1994

(Continued)

OTHER PUBLICATIONS

Office Action dated Apr. 26, 2011 in corresponding Japanese patent application No. 2009-051259.

*Primary Examiner* — Thomas Tarcza
*Assistant Examiner* — Peter Bythrow
(74) *Attorney, Agent, or Firm* — Harness, Dickey & Pierce, PLC

(57) ABSTRACT

A radar apparatus has a plurality of receiving antennas and an array transmitting antenna controlled to successively vary the direction of a transmitted beam within a range which includes a target detection range of directions. The direction of any target within the target detection range is detected based on a phase difference between incident reflected waves of adjacent receiving antennas. To eliminate false targets resulting from aliasing, each detected target is authenticated based upon closeness of its detected direction to the current transmitted beam direction. The receiving antennas and transmitting antenna are configured to exclude directions of grating lobes of the transmitted beam from the detection range, and thereby suppress effects of received reflected waves that originate from grating lobes.

19 Claims, 4 Drawing Sheets

U.S. PATENT DOCUMENTS

| | | | |
|---|---|---|---|
| 6,380,884 B1 * | 4/2002 | Satou et al. | 342/70 |
| 6,573,859 B2 * | 6/2003 | Tokoro | 342/70 |
| 6,750,810 B2 * | 6/2004 | Shinoda et al. | 342/149 |
| 6,853,329 B2 * | 2/2005 | Shinoda et al. | 342/149 |
| 7,088,286 B2 * | 8/2006 | Natsume et al. | 342/147 |
| 7,132,976 B2 * | 11/2006 | Shinoda et al. | 342/70 |
| 7,151,482 B2 * | 12/2006 | Natsume et al. | 342/147 |
| 7,158,081 B2 * | 1/2007 | Pietig et al. | 343/700 MS |
| 7,173,561 B2 * | 2/2007 | Isaji | 342/70 |
| 7,495,604 B2 * | 2/2009 | Yamano et al. | 342/107 |
| 7,612,706 B2 * | 11/2009 | Honda et al. | 342/80 |
| 7,663,537 B2 * | 2/2010 | Suzuki et al. | 342/133 |
| 7,688,255 B2 * | 3/2010 | Suzuki et al. | 342/133 |
| 7,755,537 B2 * | 7/2010 | Shimizu | 342/147 |
| 7,898,465 B2 * | 3/2011 | Yamano et al. | 342/70 |
| 7,961,139 B2 * | 6/2011 | Wiesbeck et al. | 342/147 |
| 2005/0110675 A1 * | 5/2005 | Gruener et al. | 342/128 |
| 2006/0007036 A1 * | 1/2006 | Natsume et al. | 342/70 |

FOREIGN PATENT DOCUMENTS

| | | |
|---|---|---|
| JP | 09-284035 | 10/1997 |
| JP | 2000-124727 | 4/2000 |
| JP | 2003-243959 | 8/2003 |
| JP | 2004-245602 | 9/2004 |
| WO | WO 99/34234 | 7/1999 |

* cited by examiner

RADAR APPARATUS CONFIGURED TO SUPPRESS EFFECTS OF GRATING LOBES UPON DETECTION OF DIRECTION OF TARGET BASED ON PHASE DIFFERENCE BETWEEN RECEIVED REFLECTED WAVES

CROSS-REFERENCE TO RELATED APPLICATIONS

This application is based on and incorporates herein by reference Japanese Patent Application No. 2009-051259 filed on Mar. 4, 2009.

BACKGROUND OF THE INVENTION

1. Field of the Invention

The present invention relates to a radar apparatus for detecting the direction of a target based upon reflected electromagnetic waves, and in particular to a radar apparatus having a plurality of receiving antennas and an array transmitting antenna, or a plurality of transmitting antennas and an array receiving antenna.

2. Background of the Invention

Types of radar apparatus are known having a transmitting antenna which transmits a beam of electromagnetic waves, with the direction of a target being detected based upon phase differences between resultant reflected electromagnetic waves received from the target. In the case of a phase monopulse radar apparatus, the reflected waves are received by two receiving antennas, with the direction of a target being detected based on the phase difference between reflected waves from the target that are respectively received by adjacent receiving antennas.

A phase monopulse radar apparatus has an advantage of high accuracy of direction detection, but has a disadvantage that the size of the range within which directions of targets can be detected is restricted. Considering a phase monopulse radar apparatus having a pair of receiving antennas (e.g., respective single antenna elements) spaced apart with a pitch L, designating the wavelength of the radar waves as $\lambda$, and the phase difference between respective received signals of the two receiving antennas (phase difference between reflected waves that are respectively received by the receiving antennas) as $\Delta\phi$, the direction $\theta$ of a target which reflects the waves can be obtained from the following equation:

$$\theta = (180/\pi)\sin^{-1}\{(\Delta\phi/360)\cdot(\lambda/L)\}$$

Hence if $\Delta\phi$ is within the range $-180°$ to $+180°$ then the corresponding direction $\theta$ can be unambiguously obtained from $\Delta\phi$. The range of directions for which unambiguous direction detection can be achieved is determined by the pitch L of the receiving antennas.

If values of $\Delta\phi$ exceed that unambiguous detection range, phase foldover (aliasing) occurs, i.e., it is impossible to distinguish between two targets whose respective directions correspond to phase differences of $\Delta\phi$ and $(\Delta\phi+360°)$.

For example, designating the respective directions of two targets as $\theta 1$ and $\theta 2$, and designating the phase difference (between the respective received signals of the two receiving antennas) corresponding to $\theta 1$ as $\Delta\phi 1$ and the phase difference corresponding to $\theta 2$ as $\Delta\phi 2$, and assuming that the phase difference $\Delta\phi 2$ is outside the aforementioned range of $180°$ to $+180°$ while $\Delta\phi 1$ is within the range, then the direction that is calculated as $\theta 1$ will be correct while the direction that is calculated as $\theta 2$ may differ from the actual direction.

Prior art types of phase monopulse radar apparatus have therefore had the disadvantage that target directions can only be detected within a small range of directions, to avoid effects of phase foldover.

To overcome this problem, it has been proposed for example in International Patent publication No. WO99-34234 (referred to in the following as reference document 1) to use a radar apparatus having a plurality of transmitting antennas having respectively different directions of transmitted beam, with switching being applied for transmitting radar waves from these transmitting antennas in succession. Resultant reflected waves from a target are received by two receiving antennas, and the direction of the target is detected the phase difference between respective reflected waves reaching the receiving antennas. Since reflected waves from a target are received along respectively different directions from a plurality of transmitting antennas, a greater amount of information can be obtained than is possible by using only a single transmitting antenna. The information is used to authenticate each detected target, as described in the following, to enable the target detection range to be widened while maintaining high reliability of target direction detection.

Basically, if the detected direction of a target is sufficiently close to the orientation direction of the currently transmitted beam (e.g., is within the beamwidth of the transmitted beam that is currently being transmitted) then it is judged that an actual target is detected, since reflected waves generally return along a direction which does not differ greatly from the orientation direction of the transmitted beam. Hence, if the detected direction is not sufficiently close to the direction of the transmitted beam (i.e., is not within a predetermined range that is centered on the beam direction) the target is (provisionally) assumed to be false, i.e., caused by phase foldover.

Since detected targets can thereby be reliably authenticated, it becomes possible to use a phase monopulse type of radar apparatus having a wide target detection range within which phase foldover occurs.

The problem caused by phase foldover is thereby overcome by using a plurality of transmitting antennas.

However, such a type of radar apparatus is undesirable from a practical aspect. It is preferable to utilize an array antenna formed of an array of antenna elements as the transmitting antenna, and electronic scanning. Here, "electronic scanning" signifies that shifting of the beam to successive directions (i.e., successively shifting the beam to different orientation directions, to cover successively different direction ranges) is performed by phase control of the transmission signals supplied to the elements of the array. Specifically, the direction of the transmitted beam is varied by successively varying the phase difference between transmission signals applied to adjacent antenna elements.

Such an electronic scanning method is preferable in particular for a radar apparatus which is installed in a vehicle for example, since it enables the transmitting antenna (and hence the overall radar apparatus) to made compact.

If such electronic scanning of the transmitted beam were applied, then in principle it would be possible to eliminate the problem of ambiguity caused by phase foldover, since the orientation direction of the transmitted beam is known at each point in time, and that information can be used in authenticating each detected target as described above.

However if such an electronic scanning method were simply to be directly applied to a phase monopulse of radar apparatus for enabling target directions to be detected within a range in which phase foldover occurs as described above, then problems arise due to grating lobes in the beam pattern of the transmitting antenna. In particular, at least one grating lobe adjacent to the main lobe may be of similar magnitude to the main lobe. As the pitch of the elements of an array transmitting antenna is increased, the main lobe of the antenna beam is accordingly made narrower and the antenna gain is increased. However as the pitch is increased, the magnitudes of the grating lobes become increased and the grating lobes are brought closer to the main lobe, thereby, conversely, lowering the antenna gain.

Thus if the pitch is not appropriate, the direction of a grating lobe may come within the target direction detection range, as the direction of the transmitted beam is scanned through that range. Direction detection reliability (target authentication reliability) is thereby lowered, since (due to phase foldover, i.e., aliasing) a false target which results from reflected waves originating from a grating lobe may appear to have a direction that is close to the direction of the transmitted beam (i.e., direction of the main lobe).

For that reason, it has not hitherto been practicable to apply an electronic scanning array antenna to be used as a transmitting antenna in a radar apparatus, when targets are to be detected within a range of directions whereby phase foldover occurs.

SUMMARY OF THE INVENTION

It is an objective of the present invention to overcome the above problem, by providing an electronic scanning type of radar apparatus having an array antenna as a transmitting antenna and a plurality of receiving antennas, to whereby the extent of a target detection range may be made larger than a detection ambiguity range (i.e., range within which the phase difference between respective waves received by adjacent antenna elements of the receiving antenna does not exceed 360°) while suppressing adverse effects of grating lobes in a transmitted beam of the transmitting antenna.

To achieve the above objectives, according to a first aspect, the invention provides a radar apparatus having a transmitting antenna formed of an array of antenna elements spaced apart with a fixed pitch, for transmitting a beam of electromagnetic waves, and a plurality of receiving antennas (each of which may be a single antenna element or an array antenna) spaced apart with a fixed pitch, for receiving resultant reflected waves from a target and producing respective received signals corresponding to the received waves. The apparatus further includes phase control circuitry for supplying respective transmission signals to the elements of the transmitting antenna, and applying phase control to the transmission signals for sequentially shifting the orientation direction of the transmitted beam within a predetermined target detection range, with successively different ranges of directions (referred to herein as a beamwidth range), each centered on the transmitted beam direction, being thereby successively covered by the transmitted beam. The extent of a beamwidth range is predetermined such that, if the detected direction of a target is within that range then the target can be judged to be value, while otherwise the target can be judged to be false (i.e., caused by effects of phase foldover).

The apparatus also includes direction detection circuitry, for detecting the directions of targets which are within the target detection range, with each target direction being detected based upon a phase difference between respective received signals (received waves) of adjacent receiving antennas and upon the relationship between the detected direction and the current beamwidth range that is covered by the transmitted beam. That is to say, a detected target is judged as being either valid or false, based on that relationship, as described above.

The radar apparatus is characterized in that, designating $\alpha 1$ (a value determined by the pitch of the transmission antenna elements) as the difference between respective orientation directions of the main lobe of the transmitted beam and a grating lobe (i.e., a grating lobe which is immediately adjacent to the main lobe), designating $\beta 1$ as the extent of a range of directions within which a phase difference between respective received waves of adjacent receiving antennas is within 360° (where $\beta 1$ is determined by the pitch of the receiving antennas), and designating the extent of the target detection range as $(k \times \beta 1)$, where $k>1$ (i.e., so that phase foldover occurs within the target detection range), the pitch of the antenna elements of the transmitting antenna and the pitch of the receiving antennas are respectively predetermined such that the following relationship exists:

$$\alpha 1 = k \times \beta 1$$

Specifically, the value of $\alpha 1$ is determined by the wavelength of the transmitted waves, the orientation direction of the transmitted beam, and the pitch of the transmitting antenna array elements. The pitch values are preferably selected such that the above relationship is satisfied when the direction of the transmitted beam is at a limit of the target detection range, as described hereinafter.

In that case, it is ensured that reflected waves which originate from a grating lobe will not have a direction that is within the target detection range. Adverse effects of the grating lobes are thereby suppressed.

In particular, it is ensured that a detected target can be reliably authenticated based upon the transmitted beam direction at the time of detection (e.g., based on judging whether the detected target direction is within the beamwidth of the transmitted beam, at the time of detection). That is to say, although aliasing occurs within the target detection range, is ensured that the authentication processing will not be affected by false detected targets which result from aliasing of received reflected waves that originate from a grating lobe.

The invention thereby makes it practicable to provide a radar apparatus which can utilize a compact form of array antenna such as a planar array antenna as a transmitting antenna, i.e., applying electronic scanning of a transmitted beam, and which can have a wide target detection range. High accuracy of direction detection over a wide range of target directions can thereby be achieved.

The pitch of the antenna elements of the receiving antenna and the pitch of the transmitting antennas are preferably respectively predetermined such that the difference $\alpha 1$ is substantially equal to the extent of the target detection range (i.e., the extent of the variation range of the transmitted beam direction), or is larger than the target detection range by a predetermined small margin. The size of such a margin is preferably determined based on the shape of a grating lobe.

The invention is equally applicable to a radar apparatus having two or more transmitting antennas (single elements, or respective array antennas) spaced apart with a fixed pitch and an array receiving antenna. In that case, the target detection range is the scanning range of a reception beam, which is determined by phase control of the received signals of the antenna elements of the array receiving antenna.

Specifically, from that aspect, the invention provides a radar apparatus having, in addition to the aforementioned transmitting antennas and array receiving antenna, phase control circuitry for applying phase control to the respective received signals of the receiving antenna elements, for sequentially shifting the reception beam to cover respectively different beamwidth ranges. Such a radar apparatus further includes direction detection circuitry configured to detect the direction of a target based upon detection of phase differences between received signals of receiving antenna elements and upon the beamwidth range that is covered by the reception beam at the time of detecting the phase difference. The target direction detection is performed within a range of directions in which ambiguous detection occurs, caused by phase foldover.

In that case, designating α2 as the difference between respective directions of a main lobe of the reception beam and a grating lobe of the reception beam (where α2 is determined by the pitch of the array receiving is antenna elements), designating β2 as the extent of a range of directions within which a phase difference between respective received waves of adjacent receiving antenna elements does not exceed 360° (where β2 is determined by the pitch of the transmitting antennas), and designating the target detection range as (k×β2) where k>1, the pitch of the receiving antenna elements and the pitch of the transmitting antennas are respectively predetermined such that the following relationship exists:

$$\alpha 2 = k \times \beta 2$$

Such a radar apparatus can provide similar advantages to those described above for the case of a radar apparatus having a plurality of receiving antennas and an array transmitting antenna.

The invention is moreover equally applicable to the case in which phase foldover does not occur within the range of target directions that are to be detected. In that case too, it can be ensured that received reflected waves which originate from transmitted waves corresponding to a grating lobe cannot come within the target detection range, and so cannot have adverse effects upon target direction detection.

The above features and advantages of the invention are described more particularly in the following with reference to specific embodiments.

BRIEF DESCRIPTION OF THE DRAWINGS

FIG. 3A illustrates measurement of the pitch of the antenna elements of an array transmitting antenna, while

DESCRIPTION OF PREFERRED EMBODIMENTS

Figure 1:
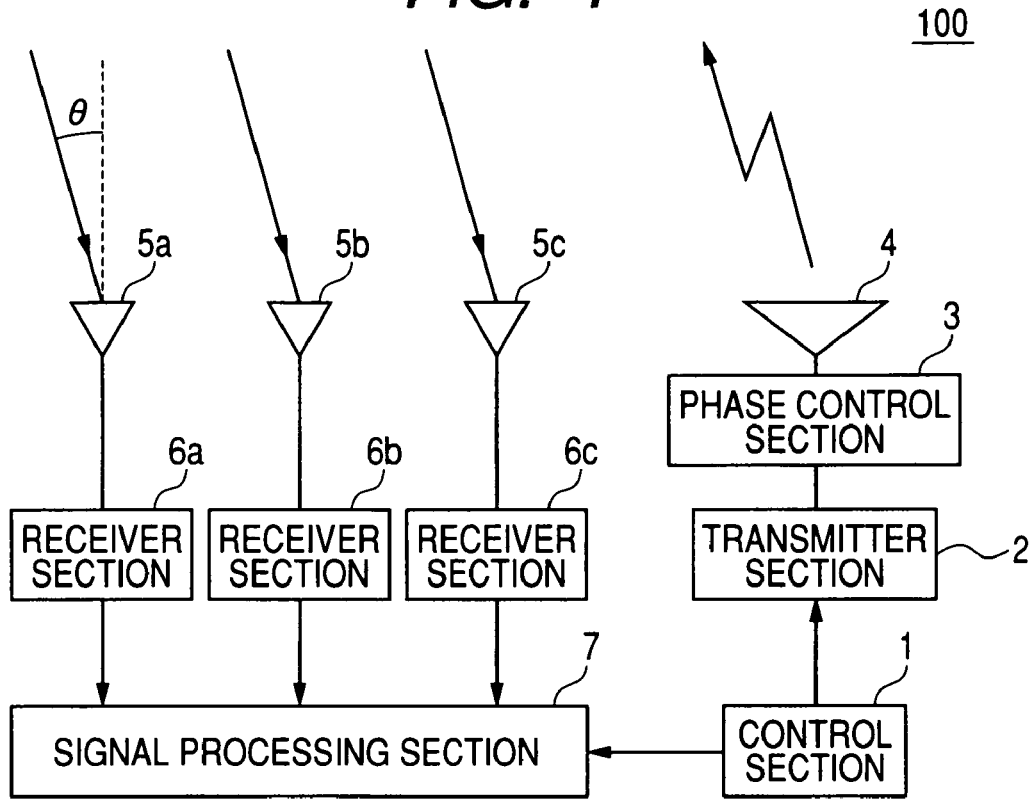
FIG. 1 shows the overall configuration of an embodiment of an electronic scanning type of radar apparatus.

FIG. 1 is a block diagram illustrating the basic configuration of an embodiment of a radar apparatus, designated by numeral 100, formed of a control section 1, a transmitter section 2, a phase control section 3, a transmitting antenna 4, a signal processing section 7, a set of three receiving antennas 5a, 5b and 5c, and three control sections 6a, 6b and 6c respectively corresponding to the receiving antennas 5a, 5b, 5c.

The control section 1 is based on a microcomputer, having a CPU, ROM, RAM, backup RAM, I/O section, etc., (not shown in the drawings), with the microcomputer executing various processing in accordance with a control program that is stored in the ROM. In particular, the control section 1 performs signal processing to control transmission of electromagnetic waves by the transmitting antenna 4, and for evaluating reflected waves (received signals) that are received by the receiving antennas 5a, 5b, 5c.

The transmitter section 2 generates a modulated high-frequency signal (using a high frequency signal source, not shown in the drawings) that is frequency-modulated with a triangular modulation waveform, under the control of the control section 1. The transmitter section 2 splits the modulated high-frequency signal (by means of a signal splitter, not shown in the drawings) into a transmission signal which is supplied to the phase control section 3 and a local oscillator signal. The phase control section 3 is connected to the transmitting antenna 4, which is an array antenna formed of a coplanar array of antenna elements. The transmitting antenna 4 corresponds to a transmitting antenna as specified in the appended claims.

The phase control section 3 includes a signal splitter (not shown in the drawings) which splits the transmission signal supplied from the transmitter section 2 into a plurality of transmission signals. The phase control section 3 applies respectively different amounts of phase shift to these transmission signals, under the control of commands from the control section 1, and includes amplifiers (not shown in the drawings)) which amplify the phase-shifted transmission signals and supply the amplified transmission signals to respective antenna elements 4a of the transmitting antenna 4.

With this embodiment, the transmission signal (modulated high-frequency signal) that is inputted from the transmitter section 2 is split into a plurality of transmission signals by a signal splitter within the phase control section 3. However it would be equally possible to perform this signal splitting by a splitter that is incorporated in the transmitter section 2, with a plurality of transmission signals being supplied to the phase control section 3.

Electromagnetic waves are transmitted from the transmitting antenna 4 as an externally directed beam. The direction in which the beam is transmitted (i.e., central direction of the beam) is determined by the phase shifts (applied by the phase control section 3) of the transmission signals of the antenna elements 4a of the transmitting antenna 4. Specifically, the beam is sequentially scanned to cover successive ranges of directions. These successively attained direction ranges will be referred to in the following description and appended claims as "beamwidth ranges", i.e., respectively different ranges which may each be of identical extent, with each range being centered on the orientation direction of the transmitted beam. The extent of each beamwidth range is predetermined such that, if the direction of a detected target is within that range, the target can be judged to be true, while otherwise the target can be judged to be false, i.e., to be an effect of phase foldover.

The range of directions through which the transmitted beam is scanned (i.e., range of variation of the orientation direction of the beam) corresponds to the target detection range (range of target directions that can be detected by the radar apparatus). Beam scanning is performed by successively varying respective amounts of phase shift that are applied to transmission signals of adjacent antenna elements of the array transmitting antenna 4.

The phase control section 3 can be configured to incorporate phase shifters such as described in Japanese Patent Publication No. 2003-243959 to control the respective phases and amplitudes of the transmission signals of the antenna elements 4a of the transmitting antenna 4, for beamforming and for scanning the transmitted beam. Alternatively, the phase control section 3 can be configured to incorporate a Rothman Lens such as is described in Japanese Patent Publication No. 2000-124727, to control the respective phases and amplitudes of the transmission signals of the antenna elements 4a. As a further alternative (as described in Japanese Patent Publication No. 6-29736), it would be possible to utilize a Butler matrix to control the respective phases and amplitudes of the transmission signals.

With the this embodiment, the transmitting antenna 4 is a planar array of antenna elements 4a, however it would be equally possible to utilize an array antenna in which the antenna elements are not coplanar.

Figure 3A:
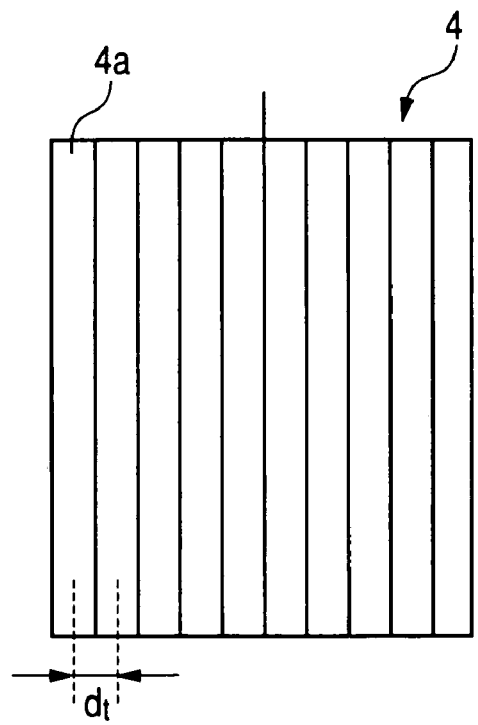
Figure 3B:
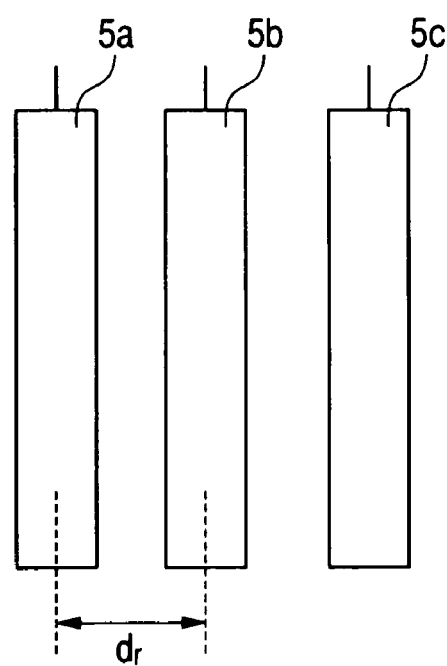
FIG. 3B illustrates measurement of the pitch of a set of equidistantly spaced receiving antennas.

As shown in FIG. 3B, the three receiving antennas 5a, 5b, 5c constituting the receiving antenna are spaced equidistantly, with a separation pitch $d_r$. With this embodiment, the receiving antennas 5a, 5b, 5c are formed as respective single antenna elements as shown, which are coplanar. However it would be equally possible to form the receiving antennas 5a, 5b, 5c as respective arrays of antenna elements, with these three arrays being coplanar. Alternatively, it would be possible to form the receiving antennas 5a, 5b, 5c as respective arrays of antenna elements which are not coplanar. The predetermined pitch of the receiving antennas is described hereinafter.

The received signals obtained by the receiving antennas 5a, 5b, 5c are respectively inputted to the receiver sections 6a, 6b and 6c.

The receiver sections 6a, 6b and 6c amplify the respectively received signals supplied thereto, and each also includes a mixer (not shown in the drawings) for mixing the corresponding received signal with the local oscillator signal, to convert (demodulate) the received signal to a baseband signal. Each of the receiver sections 6a, 6b and 6c further includes an A/D converter (not shown in the drawings), for converting the corresponding baseband signal to a digital signal, which is supplied to the signal processing section 7.

The signal processing section 7 is based on a microcomputer, having a CPU, ROM, RAM, backup RAM, I/O section, etc., (not shown in the drawings), which acquires the digital signals (digital data) supplied from the receiver sections 6a, 6b and 6c. The signal processing section 7 also includes a DSP (Digital Signal Processor, not shown in the drawings) which performs FFT (Fast Fourier Transform) processing of the acquired data, with the processing executed in accordance with a control program that is stored in a ROM. The signal processing section 7 can for example perform processing which is similar to that described in Japanese Patent Publication No. 2004-245602, for obtaining the distance, relative velocity and direction of a target, based on beat signals that are derived from the received signals of the receiving antennas 5a, 5b, 5c.

The direction of a target is derived based on a phase differences between reflected waves from the target that are respectively received by adjacent ones of the receiving antennas 5a, 5b, 5c (i.e., a phase difference expressed in the baseband signals). The signal processing section 7 performs processing similar to that described above concerning reference document 1 to eliminate ambiguity in detecting targets (ambiguity resulting from the foldover phenomenon, as described above), i.e., for authenticating each detected candidate target and obtaining the direction of each authenticated target. Here, "candidate target" signifies a possible target whose direction is detected as being within the aforementioned target detection range, i.e., a target for which a phase difference between reflected waves received by adjacent receiving antennas is within a predetermined range of phase difference values corresponding to the target detection range. With this embodiment, the target detection range is assumed to be from −20° to +20° (i.e., azimuth directions) as described hereinafter.

When a candidate target is detected, it is judged be a true target if its detected direction is sufficiently close to the orientation direction of the transmitted beam at that point in time. That is, if the detected direction is within the aforementioned beamwidth range that is covered by the transmitted beam at the time of detection, then the target is judged to be valid. Otherwise, the candidate target is (provisionally) judged to be false.

Each time the beam has become oriented to a new direction within the detection range a search is performed to find any candidate target(s) having a direction that is within the current beamwidth range and so can be judged to be valid.

In that way, target direction ambiguity can be eliminated, although the target detection range is widened to the extent that phase foldover occurs.

The signal processing section 7 corresponds to direction detection circuitry of a radar apparatus having a plurality of receiving antennas, as recited in the appended claims of the invention.

The larger the pitch of the antenna elements of a transmitter array antenna and the greater the number of antenna elements, the more narrow becomes the main lobe of the antenna beam, and the higher becomes the antenna gain. A narrow main lobe and high gain are desirable, however (for a specific number of antenna elements) as the antenna element pitch is increased, the grating lobes become accordingly larger, and there is decreased separation between the main lobe and grating lobes.

With the radar apparatus 100 of this embodiment, to suppress the adverse effects of grating lobes while enabling the target detection range to be widened to an extent whereby phase foldover occurs within that range, the pitch of the antenna elements 4a of the transmitting antenna 4 and the pitch of the receiving antennas 5a, 5b, 5c are each predetermined to satisfy a specific relationship, as described in the following.

Firstly, $\alpha 1$ will be designated as the difference in direction between the main lobe and an adjacent grating lobe, while $\beta 1$ is designated as the extent of a phase foldover period, i.e., the extent of a range of directions of received waves within which the phase difference between received waves of adjacent receiving antennas does not exceed 360°. Hence, $\beta 1$ is the size of a detection range in which directions of received reflected waves can be detected without ambiguity Parameters of the transmitting antenna and receiving antennas are predetermined such that the extent of the detection range is greater than one foldover period $\beta 1$, while enabling directions of targets (based on a phase difference between received waves of respective receiving antennas) within the detection range to be unambiguously detected (by authenticating each detected target based up on an amount of difference between the detected direction and the direction of the transmitted beam at the time of detection, as described above) without adverse effects of grating lobes.

This is achieved by determining transmitting antenna and receiving antenna parameters such that no grating lobe is oriented in a direction which comes within the target detection range. It is thereby ensured that reflected waves which result from transmitted waves corresponding to a grating lobe will not reach the receiving antennas along a direction that is within the target detection range.

Figure 2:
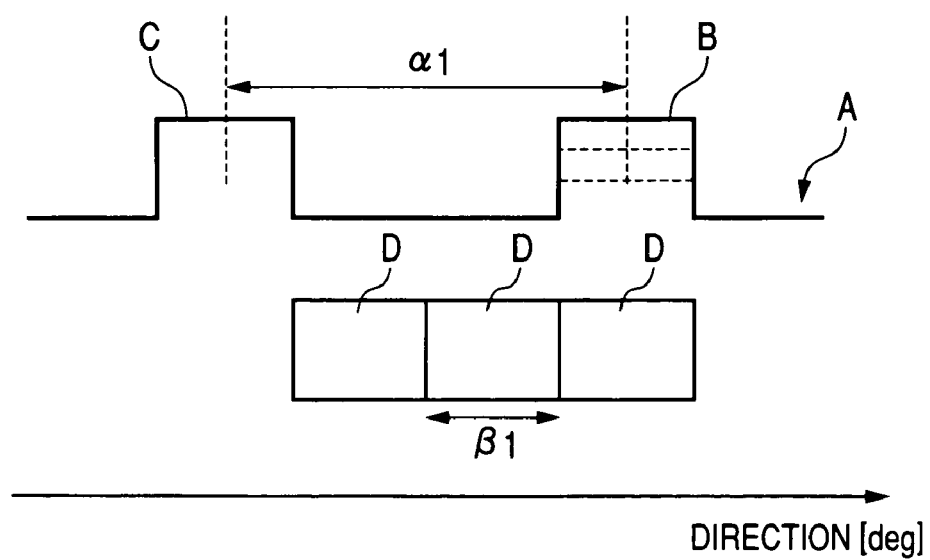
FIG. 2 is a conceptual diagram for describing the relationship between a main lobe and a grating lobe of the beam pattern of a transmitting antenna formed as an array of antenna elements.

The above will be described referring to the conceptual diagram of FIG. 2, in which "A" designates the directivity characteristic (beam pattern) of the transmitting antenna 4, "B" designates the main lobe of the transmitted beam from the transmitting antenna 4, and "C" designates a grating lobe. α1 denotes the separation between respective directions of the main lobe B and grating lobe C, with k being assumed equal to three phase foldover periods (designated as "D"), i.e. α1=(3×β1). In that case, it can be understood that a maximum size of the target detection range (3×β1) can thereby be set, while ensuring that the grating lobe C is not within the target detection range. As described hereinafter it is preferable for α1 to be made slightly larger than the target detection range by a specific amount.

Designating the wavelength of the transmitted waves as λ and the pitch of the antenna elements 4a of the transmitting antenna 4 as $d_t$, the value of α1 when the direction of the transmitted beam is θ is determined by the pitch dt, as shown by equation (1) below.

$$\alpha 1 = \sin^{-1}\left(\sin\theta - \frac{\lambda}{d_t}\right) \quad (1)$$

For the purposes of the present invention, α1 is preferably the value obtained when the beam direction θ corresponds to a limit direction of the target detection range. For example in FIG. 6 (described in detail hereinafter), concerning an embodiment in which the target detection range extends from −20° to +−20°, α1 is determined using the value of 20° for θ in equation (1) above.

Similarly, designating the pitch of the receiving antennas as $d_r$, the value of β1 is determined by $d_r$, as shown by equation (2) below.

$$\beta 1 = \sin^{-1}\left(\frac{\lambda}{d_r}\right) \quad (2)$$

Hence, the invention provides a radar apparatus having an electronic scanning array antenna and a plurality of receiving antennas, in which the pitch $d_t$ of the elements of the transmitting antenna and the pitch $d_r$ of the receiving antennas are respectively set such that the extent of the detection range exceeds one phase foldover period β1, while it is ensured that transmitted waves corresponding to a grating lobe will not have adverse effects within the target detection range.

Figure 4:
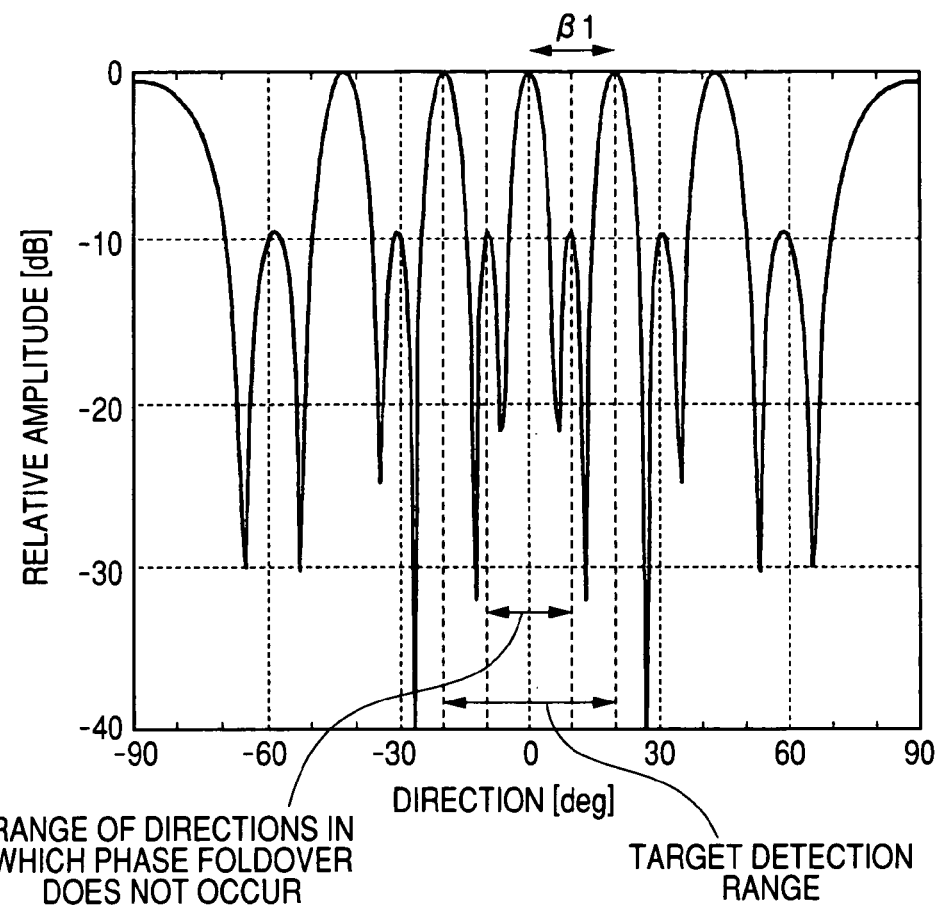
FIG. 4 shows an example of the directivity characteristic of the receiving antennas of the embodiment.
Figure 6:
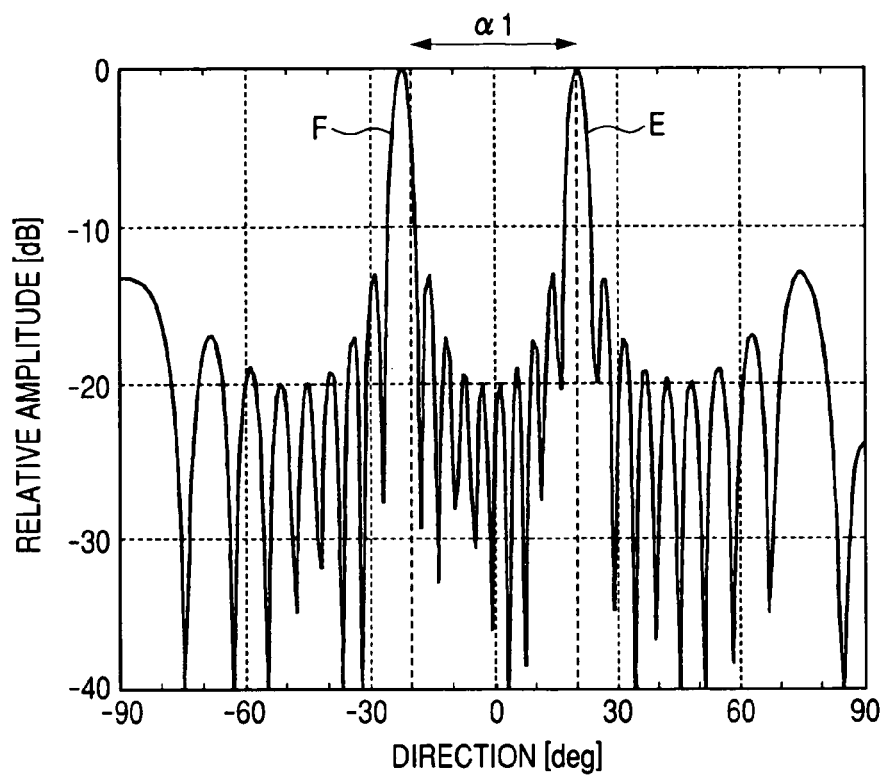
FIG. 6 shows the directivity characteristic of the array transmitting antenna of the embodiment.

FIG. 4 shows the receiving antenna directionality characteristic of this embodiment, with relative amplitude values plotted along the vertical axis and direction angles along the horizontal axis. As shown, the range of unambiguous direction detection (range in which the phase difference between received waves of adjacent receiving antennas does not exceed 360°) is between +10° and −10°, however the target detection range is expanded to ±20°. Thus there is direction ambiguity within the −10° to −20° part of the target detection range, and within the +10° to +20° part of that range, FIG. 6 shows the directionality characteristic of the transmitting antenna 4, with relative amplitude values plotted along the vertical axis and direction angles along the horizontal axis.

The transmitted beam direction is scanned within the target detection range, i.e., the aforementioned beamwidth range is sequentially shifted to be centered on successive directions within the target detection range. In FIG. 6, E denotes the main lobe of the beam and F denotes a grating lobe which is of similar magnitude to the main lobe. As shown, the difference α1 between the respective directions of the main lobe E and grating lobe F is determined such the direction of the grating lobe F is substantially equal to the target detection range (but with this embodiment, exceeds that range by a small margin as described in the following).

A method of deriving an optimum value for the quantity k in the relationship α1=(k×β1), when a desired target direction range has been specified, will be described in the following. This optimum value depends upon the frequency of the waves transmitted by the transmitting antenna 4, the required target detection range, the number of elements in the transmitting antenna array, and the number of receiving antennas. An example will be described for which the frequency of the transmitted waves is 75.6 GHz, the target detection range is to be ±20°, the number of elements of the array transmitting antenna is 10, each of the receiving antennas is formed as a single element, and the number of receiving antennas is 3.

The required extent of the target detection range (40°) is obtained if β1 is set as 20° and the target detection range is made (2×β1). The necessary pitch $d_r$ of the receiving antennas is then calculated based on equation (2), using that value of β1, and is obtained as 11.5 mm.

Figure 5:
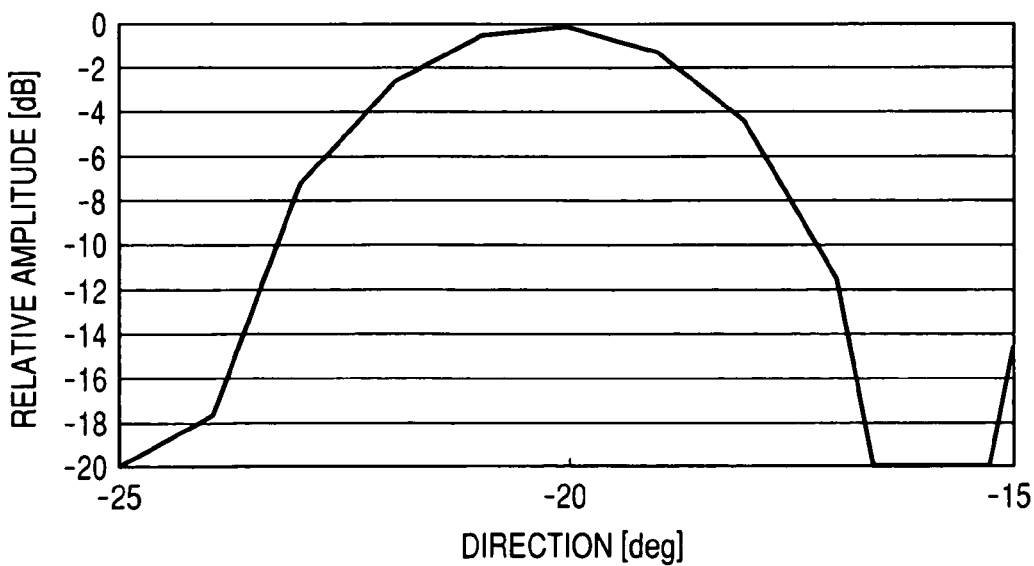
FIG. 5 illustrates the directivity characteristic of a transmitting antenna, in the vicinity of a grating lobe.

As described above, α1 is preferably made larger than the target detection range by a specific margin, to sufficiently ensure that a grating lobe will not have adverse effects within the target detection range. This margin is determined as follows. The form of the beam pattern in the vicinity of a grating lobe (when α1=40°) is shown in FIG. 5. In this case, based on the width of the grating lobe, it is determined that the margin is to be 3°, i.e., the final value of α1 is set as 43°.

Hence the optimum (final) value of k, obtained by dividing the final value of α1 by β1, is 43°/20°, i.e., 2.15.

An updated (final) value of pitch $d_t$ of the antenna elements of the transmitting antenna 4 is then calculated, using equation (1) with values of 43° for α1 and 20° for θ.

Appropriate pitch values $d_t$ and $d_r$ have thereby been determined whereby an optimum value is set for k with the detection range being ±20°. That is, the pitch of the antenna elements of the transmitting antenna and the pitch of the receiving antennas have been respectively determined such that the relationship α1=(2.15×β1) is satisfied and the extent of the detection range is made substantially equal to α1, with α1 exceeding the size of the target detection range by only a minimum necessary margin. By using such a margin, it is more effectively ensured that grating lobes cannot have adverse effects within the target detection range.

The optimum value of α1 is preferably calculated, as in the above example, for the condition in which the transmitted beam direction corresponds to a limit direction of the target detection range, i.e., +20° as shown in FIG. 6.

Figure 7:
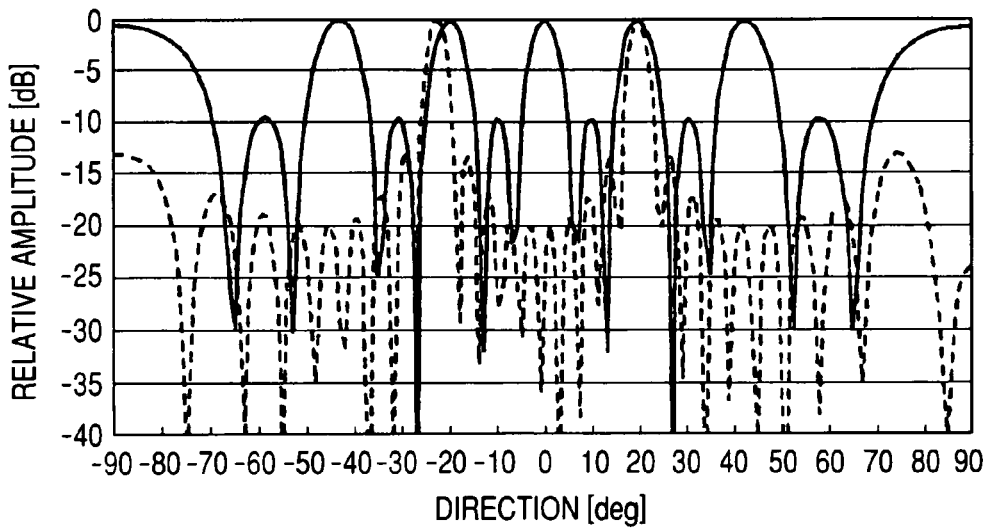
FIG. 7 shows the transmitting antenna directivity characteristic of FIG. 6 superimposed on the receiving antenna directivity characteristic of FIG. 4.

FIG. 7 shows the directivity characteristic of the receiving antenna 5 (indicated as a full-line characteristic) with the directivity characteristic of the transmitting antenna 4 (indicated as a broken-line characteristic) superimposed thereon, after optimization of the relationship between α1 and β1 as described above. Signal amplitude values are plotted along the vertical axis, and values of direction angle along the horizontal axis. This illustrates the above-described relationship between the target detection range and the separation amount α1.

Alternative Form of First Embodiment

With the first embodiment described above, a target can be detected within a detection range whose extent exceeds one foldover period β1. However the invention is equally applicable if the detection range does not exceed β1.

In that case too, effects of grating lobes upon target direction detection can be eliminated, i.e., similar effects to those described above can be obtained for a radar apparatus having an electronic scanning transmitting antenna and a plurality of receiving antennas, if the antennas are configured such that the relationship α1=(k×β1) is satisfied, where (0<k≦1), and the extent of the target detection range is substantially equal to the difference α1 between respective directions of the main lobe and a grating lobe of the transmitted beam, but is no greater than α1. That is, the pitch of the elements of the transmitting array antenna and the pitch of the receiving antennas are respectively determined such as to satisfy that relationship, as described for the first embodiment.

With such a radar apparatus, the above-described target authentication processing becomes unnecessary, since phase foldover does not occur within the target detection range. Hence the signal processing section 7 of such an alternative form of radar apparatus may be configured to omit the authentication processing. However the effects of grating lobes of the transmitted beam would be suppressed, as with the above embodiment. That is, even if the relationship between the detected direction of a detected candidate target and the orientation direction of the transmitted beam at the time of detection is not evaluated as is done with the first embodiment, it is ensured that the detected direction will not be an erroneous direction which is caused by effects of a grating lobe.

It should be noted that although the above embodiments have been described for the case in which the radar apparatus 100 has a transmitting antenna configured as a single array antenna, it would be equally possible to utilize a plurality of array antennas to constitute the transmitting antenna.

Second Embodiment

A second embodiment will be described, which employs similar principles to those of the first embodiment above for suppressing adverse effects of grating lobes upon target direction detection. Only the features of difference with respect to the first embodiment will be described. With the first embodiment, the pitch of the elements constituting the transmitting antenna 4 (array antenna) and the pitch of a plurality of equidistantly-spaced receiving antennas 5a, 5b, 5c are respectively determined such as to satisfy a predetermined relationship, for suppressing the effects of grating lobes in the beam pattern of the transmitting antenna. With the second embodiment, a plurality of transmitting antennas are utilized, spaced apart with a fixed pitch, while the receiving antenna is an array antenna.

In that case, the directivity characteristic of the receiving antenna is controlled by appropriate phase control of the received signals from the elements of the receiving antenna (i.e., similar control to that performed by the phase control section 3 for the transmission signals of the first embodiment). The reception beam direction is scanned within a predetermined target detection range, by phase control applied to the received signals of respective elements of the receiving antenna. That is, a beamwidth range of the reception beam is sequentially shifted to be centered on successively different directions within the target detection range. The direction of a target is detected based upon a phase difference between received signals of adjacent receiving antenna elements.

Designating the direction difference between the main lobe and grating lobe of the reception beam as α2 (where α2 is determined by the pitch of the array receiving antenna elements), β2 as the range of directions within which the direction of a target can be unambiguously detected (where β2 is determined by the pitch of the transmitting antennas), and designating (k×β2) as the size of the target detection range (where k>1), then the pitch of the transmitting antennas and the pitch of the array receiving antenna elements are respectively predetermined such that at the relationship α2=k×β2 is satisfied, As described for the first embodiment, a specific small margin of difference is preferably established between the target detection range and α2, based upon grating lobe width, and the value of α2 is preferably specified with respect to a condition in which the direction of the reception beam corresponds to a limit direction of the target detection range.

Similar effects can thereby be obtained to those described for the first embodiment.

More specifically with this embodiment, designating the wavelength of the transmitted waves as λ and the pitch of the antenna elements of the array receiving antenna as $d_t$, the value of α2 when the direction of the reception beam is θ is determined by $d_t$ as shown by equation (3) below.

$$\alpha 2 = \sin^{-1}\left(\sin\theta - \frac{\lambda}{d_t}\right) \quad (3)$$

Similarly, designating the pitch of the transmitting antennas as $d_r$, the value of β2 is determined by $d_r$ as shown by equation (4) below.

$$\beta 2 = \sin^{-1}\left(\frac{\lambda}{d_r}\right) \quad (4)$$

When a single array antenna is used as the receiving antenna, the direction of a target is detected based upon phase differences between reflected waves that are received by respective elements of the antenna. If the detected direction is sufficiently close to the reception beam direction (i.e., is within a predetermined beamwidth range, centered on the orientation direction of the reception beam at the time of detection) then the target is judged to be true (valid), while otherwise the target is provisionally judged to be false (i.e., caused by aliasing).

Each of the transmitting antennas of this embodiment can be formed as a single element or as an array of antenna elements.

With the second embodiment described above, a target can be detected within a detection range having an extent (k×β2) where k>1. However it would be equally possible to limit the detection range such that phase foldover does not occur within the detection range, i.e., k would be set within the range (0<k≦1). In that case the pitch of the transmitting antennas and the pitch of the transmitting antennas would be determined such that the relationship α2=(k×β2) is satisfied, where (0<k≦1), and the extent of the target detection range is substantially equal to α2.

With the first embodiment described above a set of three receiving antennas 5a, 5b, 5c are utilized, however it would be equally possible to utilize only two receiving antennas, or to utilize more than three receiving antennas. This is also the case for the transmitting antennas of the second embodiment.

Hence it should be understood that the scope of the present invention is not limited to the embodiments described above, and that various alternative configurations or modifications of these embodiments could be envisaged, which fall within the claimed scope of the invention.

What is claimed is:

1. A radar apparatus comprising:
   at least one array transmitting antenna comprising an array of antenna elements having a fixed pitch, for transmitting a beam of electromagnetic waves, and a plurality of receiving antennas spaced apart with a fixed pitch, for receiving resultant reflected waves from a target and producing respective received signals corresponding to said received waves,
   phase control circuitry configured to supply transmission signals to said antenna elements of said array transmitting antenna, and to apply phase control to said transmission signals for sequentially shifting said beam to cover successively different beamwidth ranges of direction within an extent which at least includes a predetermined target detection range,
   direction detection circuitry configured to detect a direction of a target within said target detection range, said detection based upon a phase difference between said received signals of said receiving antennas and upon a beamwidth range of said transmitted beam at a time of said detection;
   wherein,
   designating $\beta_1$ as an extent of a range of directions within which said phase difference does not exceed 360°, where $\beta_1$ is determined by said pitch of said receiving antennas, and designating $(k \times \beta_1)$ as an extent of said target detection range, where k is greater than 1, and designating $\alpha_1$ as a difference between respective orientation directions of a main lobe of said transmitted beam and a grating lobe of said transmitted beam, where $\alpha_1$ is determined by said pitch of said antenna elements of said array transmitting antenna;
   said pitch of said antenna elements of said array transmitting antenna and said pitch of said receiving antennas are respectively predetermined such that the following relationship exists:

$$\alpha_1 = k \times \beta_1.$$

2. A radar apparatus as claimed in claim 1, wherein said pitch of said antenna elements of said transmitting antenna and said pitch of said receiving antennas are respectively predetermined such that said relationship exists when said orientation direction of said transmitted beam corresponds to a limit of said target detection range.

3. A radar apparatus as claimed in claim 2, wherein said pitch of said antenna elements of said transmitting antenna and said pitch of said receiving antennas are respectively predetermined such that said difference $\alpha_1$ exceeds said extent of said target direction range by a predetermined margin, and wherein said margin is determined based on a shape of a grating lobe of said transmitted beam.

4. A radar apparatus as claimed in claim 1, wherein said pitch of said antenna elements of said transmitting antenna is a value measured between respective centers of adjacent antenna elements, and said pitch of said receiving antennas is a value measured between respective centers of adjacent receiving antennas.

5. A radar apparatus as claimed in claim 1, wherein said array transmitting antenna is a planar antenna having said antenna elements arrayed coplanar.

6. A radar apparatus as claimed in claim 1, wherein said phase control circuitry comprises a plurality of phase shifters configured to control said phases of said transmission signals.

7. A radar apparatus as claimed in claim 1, wherein said phase control circuitry comprises a Rothman lens configured to control said phases of said transmission signals.

8. A radar apparatus as claimed in claim 1, wherein said phase control circuitry comprises a Butler matrix configured to control said phases of said transmission signals.

9. A radar apparatus comprising:
   a plurality of transmitting antennas spaced apart with a fixed pitch, for respectively transmitting electromagnetic waves, and at least one array receiving antenna comprising an array of antenna elements having a fixed pitch, for receiving resultant electromagnetic waves reflected from a target and producing respective received signals corresponding to said received waves, said received signals produced in accordance with a reception beam of said receiving antenna,
   phase control circuitry configured to apply phase control to said received signals, for sequentially shifting said reception beam to cover respectively different beamwidth ranges of direction within an extent which at least includes a predetermined target detection range,
   direction detection circuitry configured to detect a direction of a target within said target detection range, said detection based upon a phase difference between said received signals of said antenna elements of said array receiving antenna and upon a beamwidth range of said reception beam at a time of said detection;
   wherein,
   designating $\beta_2$ as an extent of a range of directions within which said phase difference does not exceed 360°, where $\beta_2$ is determined by said pitch of said transmitting antennas, and designating $(k \times \beta_2)$ as an extent of said target detection range, where k is greater than 1, designating $\alpha_2$ as a difference between respective directions of a main lobe of said reception beam and a grating lobe of said reception beam, where $\alpha_2$ is determined by said pitch of said antenna elements of said array receiving antenna,
   said pitch of said antenna elements of said receiving antenna and said pitch of said transmitting antennas are respectively predetermined such that the following relationship exists:

$$\alpha_2 = k \times \beta_2.$$

10. A radar apparatus as claimed in claim 9 wherein said pitch of said transmitting antennas and said pitch of said antenna elements of said array receiving antennas are respectively predetermined such that said relationship exists when said orientation direction of said reception beam corresponds to a limit of said target detection range.

11. A radar apparatus as claimed in claim 10, wherein said pitch of said antenna elements of said receiving antenna and said pitch of said transmitting antennas are respectively predetermined such that said difference $\alpha_2$ exceeds an extent of said target detection range by a predetermined margin, and wherein said margin is determined based on a shape of a grating lobe of said reception beam.

12. A radar apparatus as claimed in claim 9, wherein said array receiving antenna is a planar antenna having said antenna elements arrayed coplanar.

13. A radar apparatus as claimed in claim 9, wherein said phase control circuitry comprises a plurality of phase shifters configured to control said phases of said received signals.

14. A radar apparatus as claimed in claim 9, wherein said phase control circuitry comprises a Rothman lens configured to control said phases of said received signals.

15. A radar apparatus as claimed in claim 9, wherein said phase control circuitry comprises a Butler matrix configured to control said phases of said received signals.

16. A radar apparatus comprising:
- at least one array transmitting antenna comprising an array of antenna elements having a fixed pitch, for transmitting a beam of electromagnetic waves, and a plurality of receiving antennas spaced apart with a fixed pitch, for receiving resultant reflected waves from a target and producing respective received signals corresponding to said received waves,
- phase control circuitry configured to supply respective transmission signals to antenna elements of said transmitting antenna, and to apply phase control to said transmission signals antenna for shifting said beam to cover successively different beamwidth ranges of direction within an extent which at is least includes a predetermined target detection range,
- direction detection circuitry configured to detect a direction of a target within said target detection range, said detection based upon a phase difference between respective received signals of said receiving antennas and upon a beamwidth range of said transmitted beam at a time of said detection;
- wherein,
- designating $\beta 1$ as an extent of a range of directions within which a phase difference between respective received waves of adjacent ones of said receiving antennas does not exceed 360°, where $\beta 1$ is determined by said pitch of said receiving antennas, designating $(k \times \beta 1)$ as an extent of said target detection range, where $(0 > k \geq 1)$, and designating $\alpha 1$ as a difference between respective orientation directions of a main lobe of said transmitted beam and a grating lobe of said transmitted beam, where $\alpha 1$ is determined by said pitch of said antenna elements of said transmitting antenna,
- said pitch of said antenna elements of said array transmitting antenna and said pitch of said receiving antennas are respectively predetermined such that the following relationship exists:

$$\alpha 1 = k \times \beta 1.$$

17. A radar apparatus as claimed in claim 16, wherein said pitch of said antenna elements of said array transmitting antenna and said pitch of said receiving antennas are respectively predetermined such that said relationship exists when an orientation direction of said transmitted beam corresponds to a limit of said target detection range.

18. A radar apparatus comprising:
- a plurality of transmitting antennas spaced apart with a fixed pitch, for respectively transmitting electromagnetic waves, and at least one array receiving antenna comprising an array of antenna elements spaced apart with a fixed pitch, for receiving resultant electromagnetic waves reflected from a target and producing respective received signals corresponding to said received waves, said received signals produced in accordance with a reception beam of said array receiving antenna
- phase control circuitry configured to apply phase control to said received signals, for sequentially shifting said reception beam to successively different beamwidth ranges within an extent which at least includes a predetermined target detection range,
- direction detection circuitry configured to detect a direction of a target within said target detection range, said detection based upon a phase difference between said respective received signals and upon a beamwidth range of said reception beam at a time of said detection;
- wherein, designating $\beta 2$ as an extent of a range of directions within which a phase difference between respective received waves of adjacent ones of said antenna elements of said receiving antenna does not exceed 360°, where $\beta 2$ is determined by said pitch of said transmitting antennas, designating $(k \times \beta 2)$ as an extent of said target detection range, where $(0 > k \geq 1)$, and designating $\alpha 2$ as a difference between respective directions of a main lobe of said reception beam and a grating lobe of said reception beam, where $\alpha 2$ is determined by said pitch of said antenna elements of said receiving antenna,
- said pitch of said transmitting antennas and said pitch of said antenna elements of said array receiving antenna are respectively predetermined such that the following relationship exists:

$$\alpha 2 = k \times \beta 2.$$

19. A radar apparatus as claimed in claim 18, wherein said pitch of said transmitting antennas and said pitch of said antenna elements of said array receiving antenna are respectively predetermined such that said relationship exists when an orientation direction of said reception beam corresponds to a limit of said target detection range.

* * * * *